UNITED STATES PATENT OFFICE.

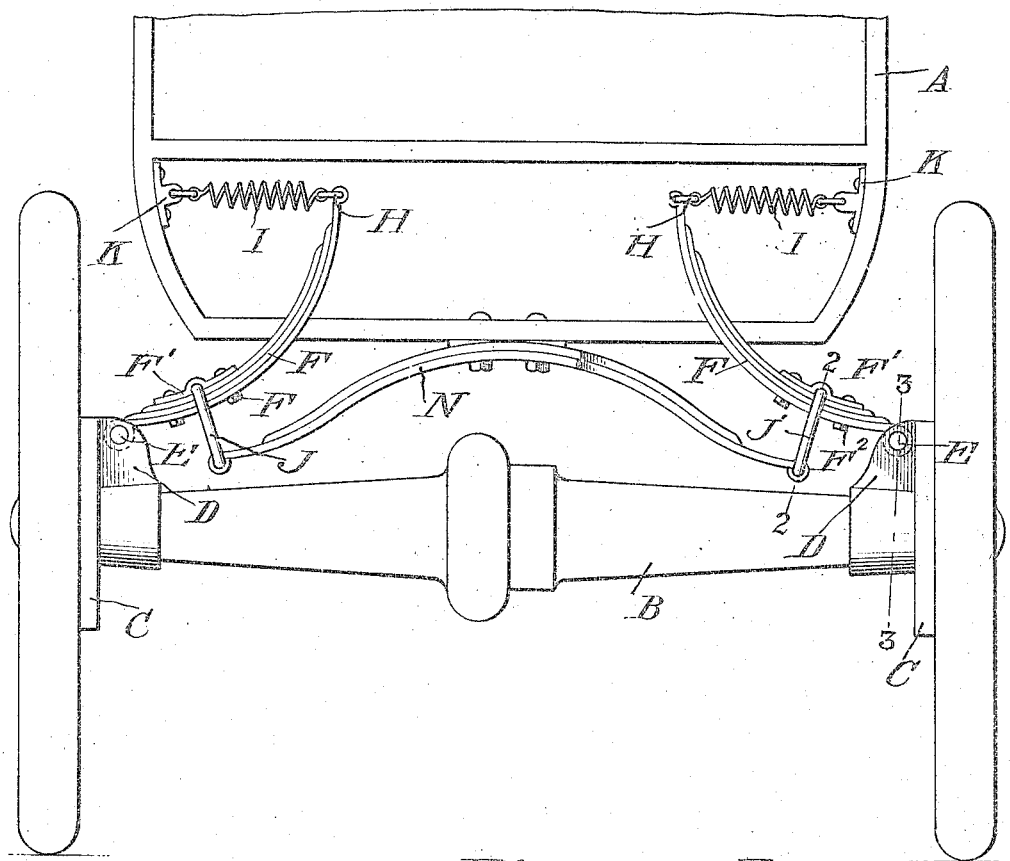
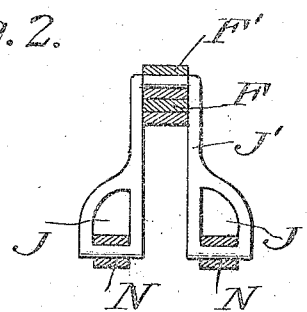
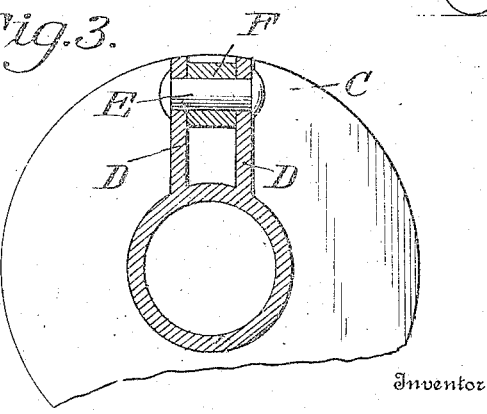

THOMAS H. SPARKS, OF WICHITA, KANSAS.

VEHICLE SPRING SUSPENSION.

1,131,281.  Specification of Letters Patent.  Patented Mar. 9, 1915.

Application filed August 26, 1914. Serial No. 858,726.

*To all whom it may concern:*

Be it known that I, THOMAS H. SPARKS, a citizen of the United States, residing at Wichita, in the county of Sedgwick, and State of Kansas, have invented certain new and useful Improvements in Vehicle Spring Suspension; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in vehicle springs for use in overcoming the shock from uneven roads and preventing the swaying of the body portion of the vehicle and comprises a simple and efficient apparatus of this nature having various details of construction, combinations and arrangements of parts which will be hereinafter fully described, shown in the accompanying drawings and then specifically defined in the appended claims.

I illustrate my invention in the accompanying drawings, in which:

Figure 1 is a rear elevation of a vehicle showing the application of my springs thereto. Fig. 2 is a sectional view on line 2—2 of Fig. 1, and Fig. 3 is a sectional view on line 3—3 of Fig. 1.

Reference now being had to the details of the drawings by letter, A designates the body of a vehicle, B the axle and C the hub flanges, each of which fits over the axle and each is provided with two upwardly projecting wings D, spaced apart, which are apertured for the reception of a bolt E. Supporting springs F are pivotally connected at their lower ends to the bolt E and their upper ends are connected with the links H and which are fastened to the inner ends of the springs I, the outer ends of said springs being fastened to the plate K secured to the body of the vehicle.

The body of the vehicle is supported upon springs N which, at their lower ends, are fastened in the apertures J in the stirrup-shaped members J', a detail of one of which is shown in Fig. 2 of the drawings. Said members J fit over the springs F and are held in place by means of the plate F' through which bolts F² pass.

It will be noted upon reference to the drawings that the springs F are positioned directly above the axle while the springs N are positioned one upon either side of the axle.

By the provision of shock absorbing means made in accordance with my invention, the vibration incident to a vehicle passing over rough roads will not come directly upon the body springs N, but rather upon the springs F at the lower ends thereof, the vibration being minimized or taken up by means of the coiled springs I. By the arrangement of the springs I as shown, it will be noted that a direct pull is afforded against any swaying motion of the body of the vehicle. The connection between the springs F and the bolt upon the wings D may be positioned against the hub, reducing the strain upon the axle to minimum. By the arrangement of the springs shown, the heavier the load the more direct will the pressure be thrown into the hub, thus relieving the center of the axle of vertical strain.

What I claim to be new is:—

1. An apparatus for taking up vibrations and preventing swaying of vehicle bodies, comprising, in combination with an axle and body of the vehicle, projections upon the axle, leaf springs connected to said projections, hangers pivotally mounted one upon each leaf spring and having apertured ends, resilient connections between the upper ends of the leaf springs and the side walls of the body of the vehicle, springs secured to the bottom of the body and supported at their ends upon said hangers.

2. An apparatus for taking up vibrations and preventing swaying of vehicle bodies, comprising, in combination with an axle and body of the vehicle, projections upon the axle, leaf springs connected to said projections, a hanger pivotally mounted upon said springs and having apertured ends positioned one upon each side of the axle, springs secured to the body of the vehicle, one upon either side of the axle and engaging an apertured end of the hanger.

3. An apparatus for taking up vibrations and preventing the swaying of vehicle bodies, comprising in combination with an axle and body of a vehicle, hub flanges upon the axle, leaf springs having their lower outer ends connected to said hub flanges, staple-shaped hangers pivotally mounted one upon each leaf spring and having apertured ends, coiled springs connecting the upper ends of the leaf springs with the opposite sides of the body of the vehicle, and supporting springs secured to the bottom of the body and having their ends secured in the apertures of said staple-shaped members, as set forth.

In testimony whereof I hereunto affix my signature in presence of two witnesses.

THOMAS H. SPARKS.

Witnesses:
D. E. WIRE,
O. V. WALKER.